United States Patent [19]
von der Heide et al.

[11] Patent Number: 4,528,466
[45] Date of Patent: Jul. 9, 1985

[54] COMPONENTS FOR POLYPHASE LINEAR MOTORS

[75] Inventors: Johann von der Heide, Mönchweiler; Georg Papst, St. Georgen, both of Fed. Rep. of Germany

[73] Assignee: Papst Motoren KG, St. Georgen, Fed. Rep. of Germany

[21] Appl. No.: 133,134

[22] Filed: Mar. 24, 1980

[30] Foreign Application Priority Data

Mar. 29, 1979 [DE] Fed. Rep. of Germany ....... 2912532
Sep. 28, 1979 [DE] Fed. Rep. of Germany ....... 2939445

[51] Int. Cl.³ .............................................. H02K 41/02
[52] U.S. Cl. ......................................... 310/12; 310/13; 104/290
[58] Field of Search ..................................... 310/12–14, 310/216; 318/138; 104/148 LM

[56] References Cited

U.S. PATENT DOCUMENTS 1,136,942  4/1915  Cutten ................................. 310/216
4,220,899  9/1980  von der Heide ................. 310/12 X

*Primary Examiner*—Donovan F. Duggan
*Attorney, Agent, or Firm*—Michael J. Striker

[57] ABSTRACT

An internal flux-conducting member is axially elongated and is manufactured with at least one radially extending electrical discontinuity, to prevent circumferential eddy currents from flowing therewithin in paths which are circular as viewed along its axis. The member may be a single unitary element into which elongated slots are cut, or may be assembled of a plurality of like rods which, when assembled together, have abutting surfaces which form the electrical discontinuities. The rods may be joined together by a nonconductive metal-bonding agent.

An external flux-conducting member is disclosed in which at least two like curved frame elements which are made of ferromagnetic material are connected together so as to form a hollow, open-ended frame with an axially elongated and generally cylindrical shape. The frame thus formed contains a plurality of annular magnet rings which are all radially magnetized, with adjacent magnet rings being magnetized in opposite direction. The magnet rings may be formed as individual units or as assemblies of arcuate half-shells. The magnet rings may be bonded to the frame in which they are held fixed.

12 Claims, 10 Drawing Figures

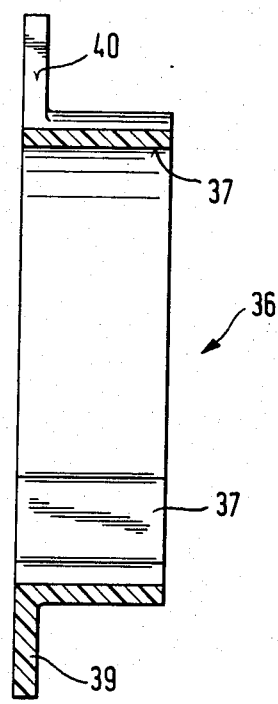
_Fig: 6_
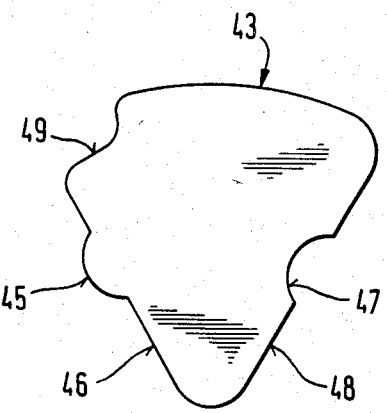
_Fig: 7_
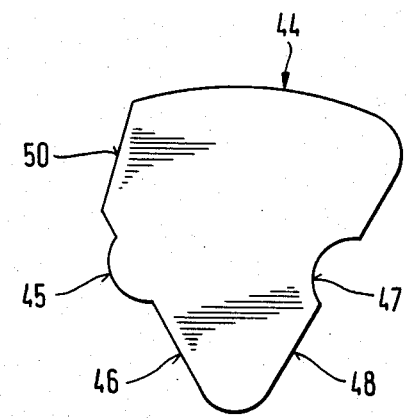
_Fig: 8_

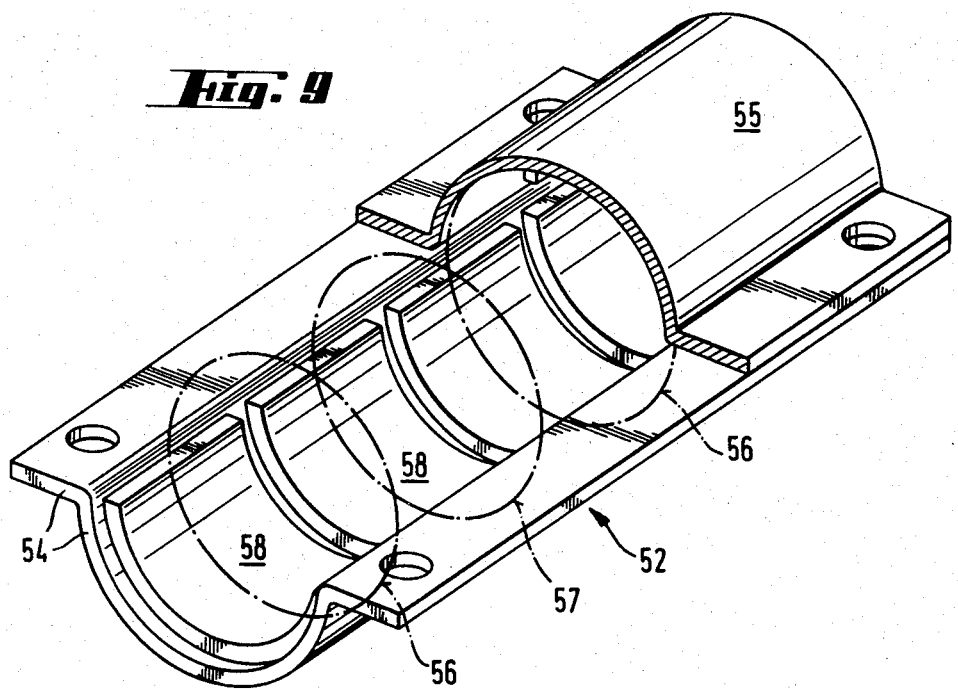
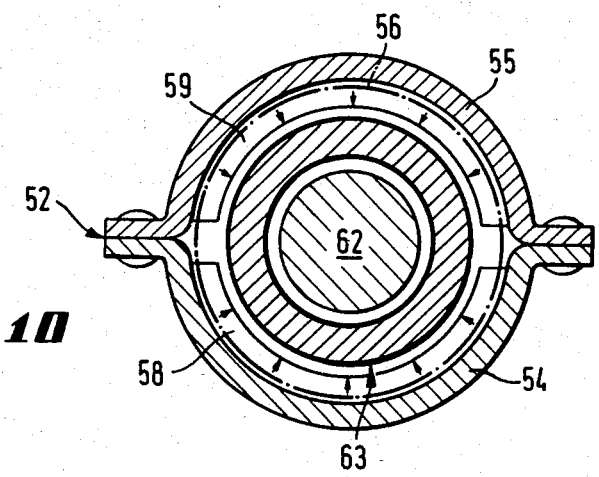

COMPONENTS FOR POLYPHASE LINEAR MOTORS

BACKGROUND OF THE INVENTION

1. Field of the Invention

The invention relates to a polyphase linear motor with a stationary series of coils set upon an internal flux-conducting member, with a secondary excited by permanent magnetism and concentrically enveloping some of the coils, and with external ferromagnetic flux-conducting members concentrically enclosing the secondary. The invention finds application in e.g., peripheral data-processing equipment.

2. Description of the Prior Art

A polyphase linear motor of this type is described commonly owned U.S. Pat. No. 4,220,899. The entire disclosure of that patent is incorporated herein by reference.

In this reference the coil arrangement consists of at least two coils longitudinally offset relative to each other along the longitudinal motor axis, while the secondary (which is excited by permanent magnetism) is provided with a plurality of juxtaposed magnets which alternate in directions of magnetization. Spacing of the coils and spacing of the magnets along the longitudinal motor axis is matched in such a manner that cyclical energizing of the coils may generate a motive force acting upon the permanently magnetized secondary.

In the reference, the secondary supports radially magnetized magnetic plates of polygonal form, which form is preferably hexagonal. Particularly in this arrangement, several polygonal or, respectively, circular, magnet units with radially alternating directions of magnetization are axially juxtaposed. Although this construction is highly efficient, and although only a low iron weight is required since the ferromagnetic parts do not tend to saturate, construction of the secondary is a relatively expensive proposition.

In this reference a massive ferromagnetic rod forms the internal flux-conducting member. The motor is robust and simple.

In practice, however, it has been found that undesirable eddy currents, may occur in the internal flux-conducting member when the coils are energized. This decreases motor efficiency.

SUMMARY OF THE INVENTION

It has been found that this deficiency may be remedied in a simple manner by providing the internal flux-conducting member with circumferentially arranged means for suppressing eddy currents.

In a first embodiment of the invention, the internal flux-conducting member may be constructed from ferromagnetic shapes which have one or more radially extending slots. Such slots, which are elongated to extend along the entire length of the internal flux-conducting member, will effectively inhibit development of such eddy currents. Producing the slots is, however, relatively expensive.

In a second embodiment of the invention, the internal flux-conducting member is assembled from several parallel ferromagnetic components. Abutting surfaces of adjacent components will act in a manner corresponding to the aforementioned elongated slots. Production, however, is considerably simplified, and thus made less expensive.

It suffices if the components abut along essentially radial adjoining surfaces and if the components have an essentially circular cross section. A concentric construction then results. The components may all have a single cross-sectional shape.

The components may advantageously be fastened together by an electrically non-conductive metal-bonding agent. This will not only result in high mechanical strength but will also permit simple finishing operations to be performed upon the assembled internal flux-conducting member so constructed.

In order to improve joinder of the components, and to further facilitate handling during assembling and final manufacturing operations, the components can be provided with positive interlocking elements in the zones of their abutment.

The components may furthermore bound at least one axial passage suitable for conducting coolants or may be provided with exterior recesses for the accommodation of supply lines for the coils, or both.

Coil bodies for accommodation of the coils are preferably slipped onto the internal flux-conducting member, the interior surface of the coil bodies matching the external surface of the internal flux-conducting member.

Extruded or rolled components, heat treated for the suppression of hysteresis losses, have proved particularly suitable.

In a further feature of this invention, manufacturing expense associated with the secondary may be reduced by forming every magnet unit with two or more magnet shells having identical radial magnetization directions. Such magnet shells are mass-produced and low-priced and are available in the shape of annular half-shells or in the shape of complete annular sectors. Ferrite shells of this type are now being used for other applications, e.g., rotating commutator motors, and are particularly suitable for applications where a low price is of primary importance. Magnet shells of samarium-cobalt come into consideration when of optimum magnetic characteristics is required. The magnet shells will be simple to install in either instance.

As disclosed in the reference mentioned above, the external flux-conducting members may either be stationary or may be attached to the secondary. In the latter instance, the magnet shells should preferably be bonded into the external flux-conducting members.

BRIEF DESCRIPTION OF THE DRAWINGS

FIG. 6 shows a longitudinal section through the embodiment shown in FIG. 5;

FIGS. 7 and 8 show cross sections through further embodiments of the internal flux-conducting member;

FIG. 9 shows an exploded perspective view of a preferred modified embodiment of the secondary; and FIG. 10 shows a schematic cross section through a polyphase linear motor provided with the modified embodiment of FIG. 9.

DETAILED DESCRIPTION OF PREFERRED EMBODIMENTS

Figure 1:
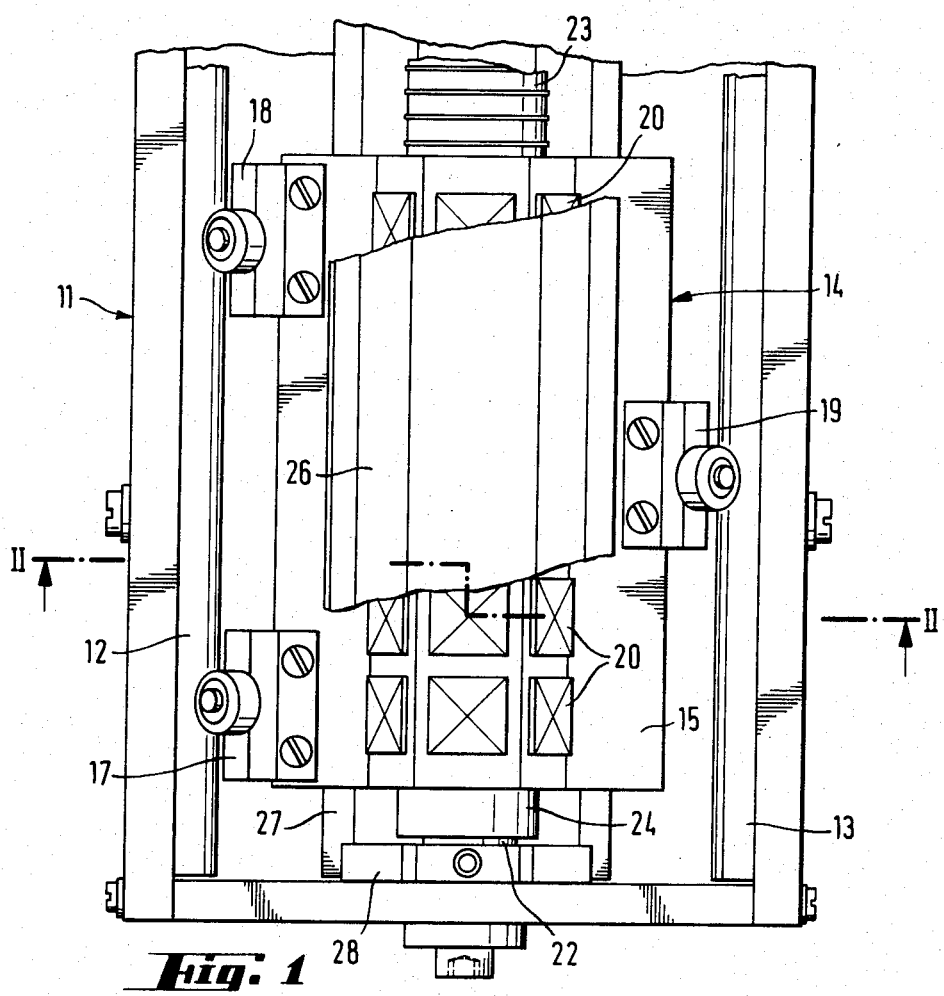
FIG. 1 shows a partially sectioned top view onto one end of a first embodiment of the invention.
Figure 2:
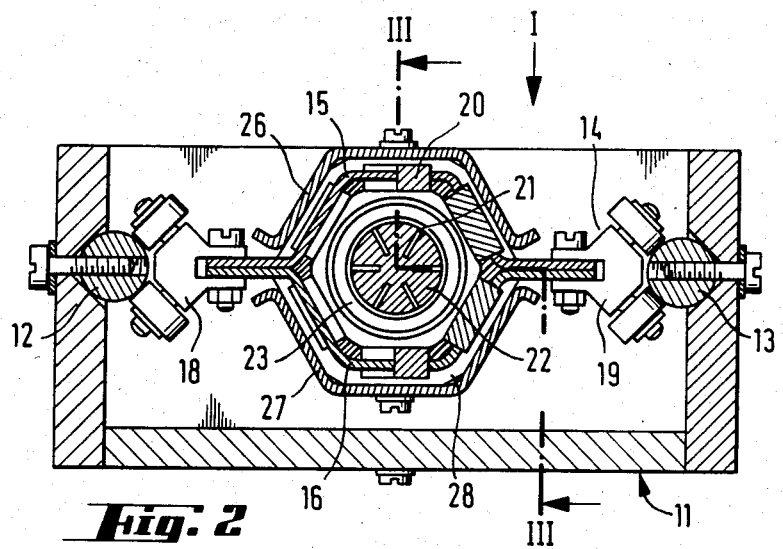
FIG. 2 shows a section along line II—II of FIG. 1.
Figure 3:
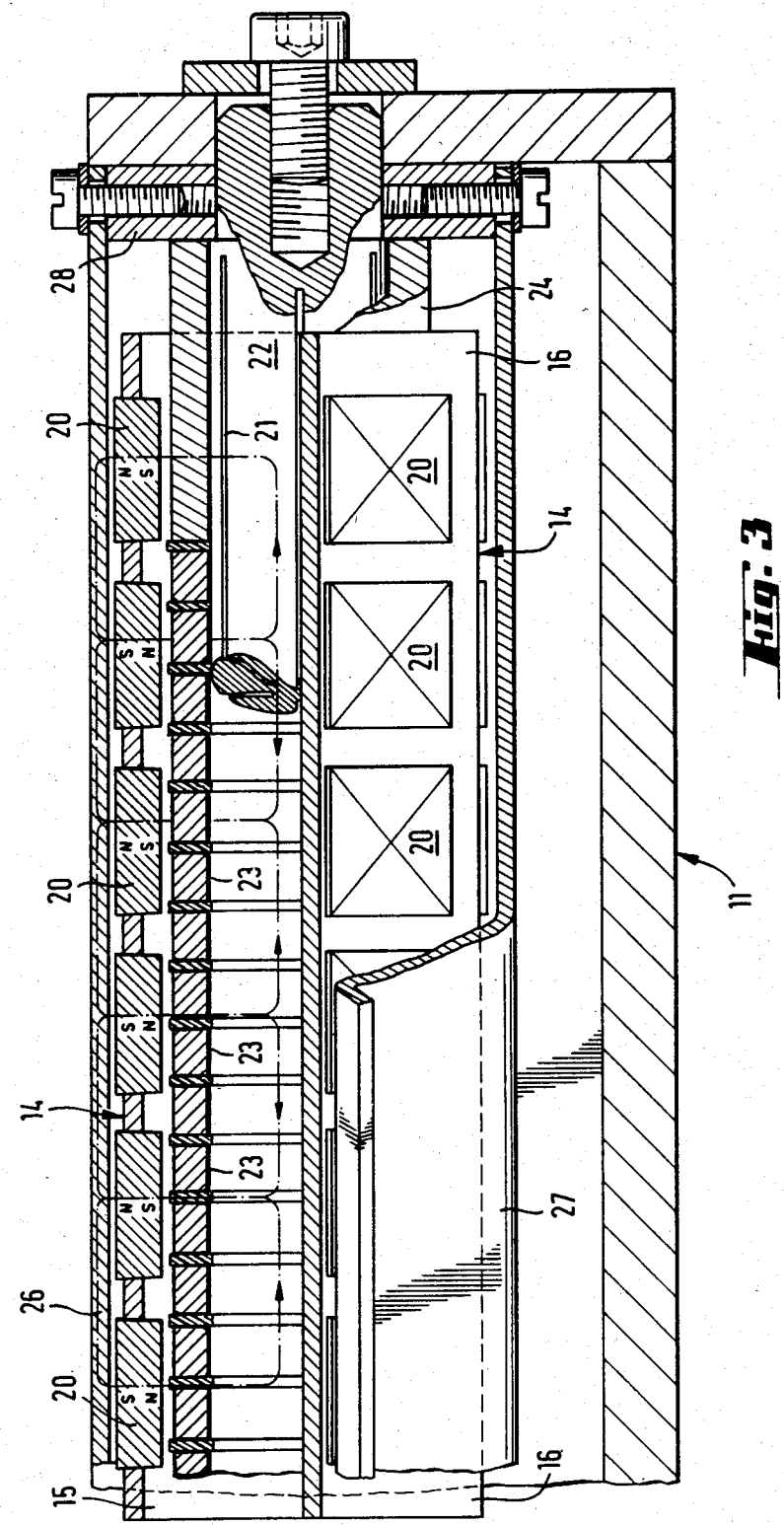
FIG. 3 shows, in a larger scale, a longitudinal section along the line III—III of FIG. 2.

The linear motor represented in FIGS. 1 to 3 is provided with a U-shaped support 11. Two tracks 12 and 13, for the secondary (which secondary is in its entirety, identified by reference numeral 14) are attached to the two vertical legs of support 11. In the embodiment represented here, secondary 14 is assembled from two non-ferromagnetic polygonal half shells 15 and 16 connected together and also connected to three guide roller groups 17, 18 and 19. Two respective guide rollers of groups 17 and 18 ride on track 12, while the two guide rollers of group 19 ride on track 13. Half shells 15 and 16, which together have a regular hexagonal cross section, support six groups of axially spaced magnet plates 20, which plates 20 are set into half shells 15 and 16. One magnet plate is attached to every side of the half shells 15, 16 of each magnet plate group. Magnet plates 20 in a group or magnet unit are radially magnetized in the same direction (i.e. North pole at the exterior, South pole at the interior). The directions of radial magnetization will alternate between one magnet plate group and the next axially adjacent magnet plate group.

A ferromagnetic internal flux-conducting member 22 is connected to support 11. A series of individual annular coils 12 are axially juxtaposed on internal flux-conducting member 22. Two electrically conductive sleeves 24 are slipped onto internal flux-conducting member 22 at both ends of the motor. Coils 23 are concentrically enclosed by secondary 14. These components are, in turn, enveloped by two ferromagnetic polygonal half shells 26 and 27 acting as external flux-conducting members. Each of half shells 26 and 27 is supported at both of its axial ends by a respective hexagonal bracket 28.

In this embodiment, internal flux-conducting member 22 is a round bar. Preferably, internal flux-conducting member 22 is cold-hammered or cold-drawn prior to soft annealing. Internal flux-conducting member 22 bears six small radial slots 21 which are evenly circumferentially evenly spaced apart from each other and which axially extend at least over that portion of flux-conducting member 22 which is enveloped by coils 23.

Figure 4:
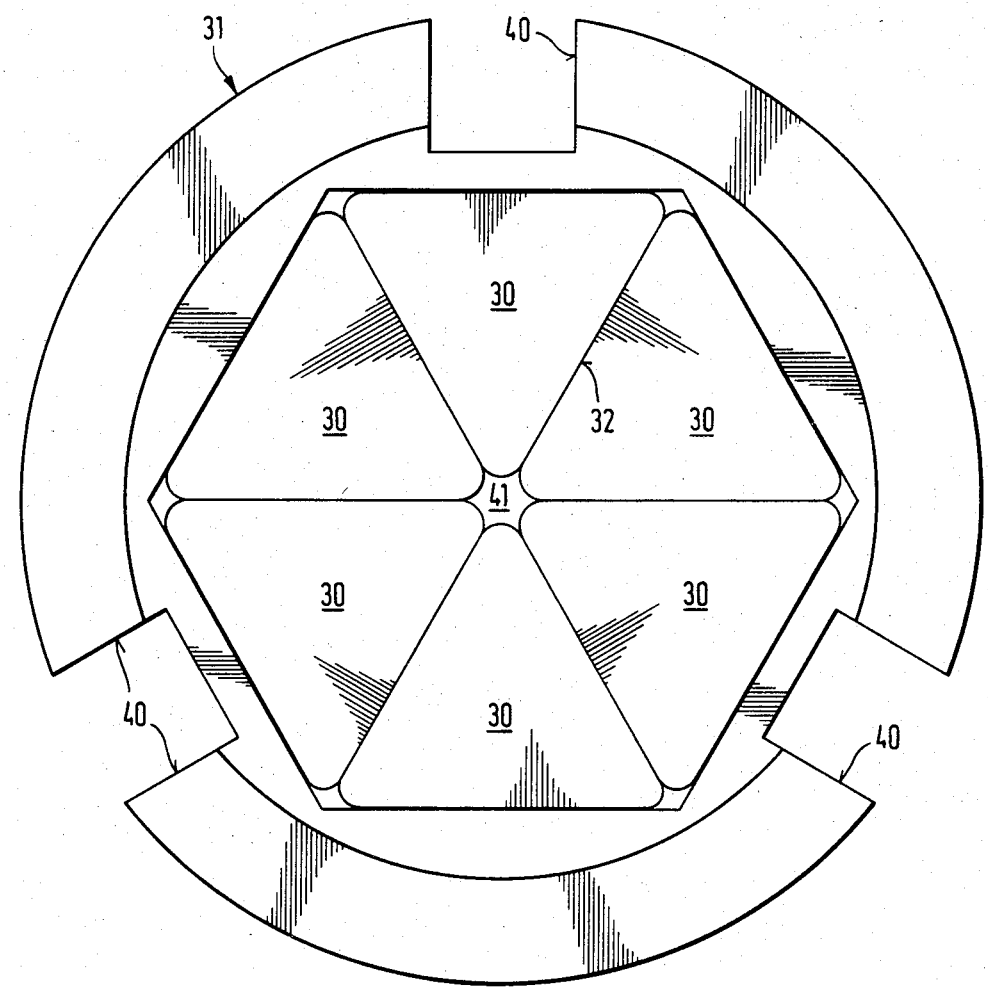
FIG. 4 shows in a larger scale, a longitudinal section of a second embodiment of the invention, through the internal flux-conducting member with the coil body slipped onto it.
Figure 5:
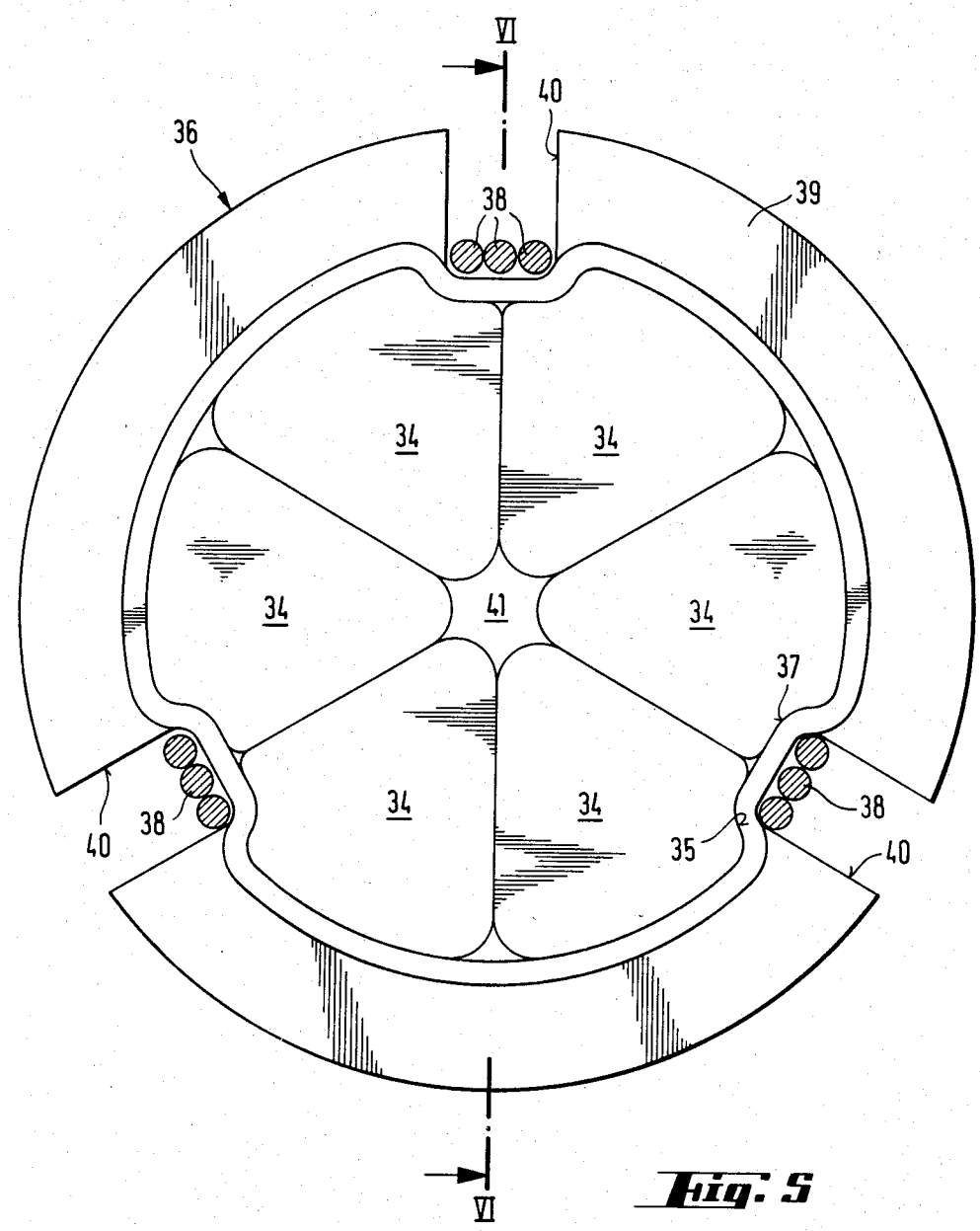
FIG. 5 shows a cross section similar to FIG. 4, for a third embodiment of the invention.

In the second embodiment shown in FIG. 4, internal flux-conducting member 22 is assembled from six triangular rods 30. Rods 30 will, when assembled, form a unit of hexagonal cross-section onto which coil bodies 31 (which hold coils 23) are slipped, the internal surface of coil bodies 31 having a corresponding mating hexagonal shape. Rods 30 are fastened together at joints 32 by an electrically non-conductive bonding agent. This produces a high strength internal flux-conducting member. Joints 32 act as interruptions in the paths of circumferential eddy currents which tend to arise in the internal flux-conducting member upon energization of coils 23. Grooves 40 to accommodate supply lines for coils 23 are molded into coil body 31. FIG. 5 shows an embodiment of the internal flux-conducting member in which six sector-shaped rods 34 are bonded to each other. Each of rods 34 has a flute 35 adjacent one longitudinal edge. Each flute 35 is abutted by a corresponding flute of an adjacent rod 34. This symmetrical construction allows all of rods 34 to be identical as they are in the embodiment of FIG. 4. When assembling the internal flux-conducting member it is merely necessary to offset every second rod by 180°. The group of shaped rods (i.e., the internal flux-conducting member) is enveloped by coil bodies 36 for coils 23. Coil bodies 36 have indentations 37 which fit into flutes 35 and accommodate coil supply lines 38. To facilitate insertion of supply lines 38, flanges 39 of coil bodies 36 are provided with slots 40 aligned with identations 37. The assembled shaped rods 34 bound a central passage 41 through which coolants such as cooling water or compressed air may pass to dissipate heat, or into which a heat pipe may be introduced.

FIGS. 7 and 8 show in cross-section two further embodiments of profiled rods 43 and 44 which may be assembled in a fashion similar to that shown in FIG. 5 to form an internal flux-conducting member. Rods 43 and 44 essentially differ from the embodiment of FIG. 5 by having longitudinal projections 45 on respective lateral surfaces 46 and further having mating longitudinal grooves 47 on other lateral surfaces 48. These locking arrangement will facilitate assembly. They will, in particular, prevent displacement of the bundled shaped rods prior to setting of the metal-bonding agent, by positively engaging them together where they abut each other.

In these embodiments, flutes 49 and 50 form passages into which supply lines for the coils or indentations of the coil bodies may be inserted. In this respect, these embodiments are similar to the embodiment of FIG. 5.

The internal flux-conducting members assembled from the shaped rods 30, 34, 43 and 44 may be attached to support 11 by an axial screw, as shown in FIG. 3. Instead, or additionally, end pieces may be set onto both ends of the internal flux-conducting member, and in turn attached support 11. Embodiments using rods of sector-shaped cross section may, if required after joining, (and particularly after bonding of the rods) be set at both ends into shaped end pieces and be finish-turned or ground in a centerless grinder.

To operate the motor, selected coils 23 will be energized by a commutation device (not shown), which selects coils to be energized in dependence upon position of secondary 14. The commutating device may appropriately be provided with an optoelectronic position sensor for determining the magnet position and be otherwise designed a the manner described in U.S. Pat. No. 4,151,447.

Means, known per se, may be provided for operating the linear motor as a servo motor. Coils 23 may also be connected to a positioning control as known, for instance, from U.S. Pat. No. 4,042,863, in order to obtain a stepped-drive motor or positioning drive. Indication of the position may herein suitably be made by optoelectronic means. A reference zero serving for position indication may suitably be located at a dust-protected location near the base of the support 11.

In the embodiment of FIGS. 9 and 10, the secondary 52 of the polyphase linear motor has a frame which consists of two ferromagnetic half-shell-shaped external flux-conducting members 54 and 55 which are attached together by rivets, for example. A plurality of magnet rings 56, 57 are supported within the frame, and are ordered so that axially adjacent ones are magnetized in radially opposite directions. In the embodiment shown, every magnet ring 56, 57 will be formed two magnet half-shells 58 and 59, which are radially magnetized in the same direction and bonded into the external flux-conducting members 54 or 55, as the case may be.

Secondary 52 is so supported in a manner not shown in detail, that it is axially displaceable along a stationary ferromagnetic internal flux-conducting member 62 and also along stationary coil array consisting of a series of axially adjacent individual annular coils 62 set upon internal flux-conducting member 62, as is described in detail in U.S. Pat. No. 4,220,899.

More than two magnet shells may be provided to constitute the magnet units, for instance, three commercially available magnet shells with a respective angular extension of about 100° to 120°. Whilst FIG. 10 depicts an internal flux-conducting member 62 constructed as a solid rod, an internal flux-conducting member such as has been disclosed above can be substituted instead.

We claim:

1. An improved internal flux-conducting member for use in linear motors, comprising an elongated electrically conductive element with an axis and assembled of a plurality of separate elongated rods having abutting surfaces, said abutting surfaces extending essentially radially outwardly from an interior of the member to an exterior thereof and forming at least one axially elongated and radially extending electrical discontinuity which is so situated that circumferential eddy currents within the element are prevented from flowing in paths which are circular as viewed along the axis.

2. The member defined by claim 1, wherein each rod has a generally circular cross-section.

3. The member defined by claim 1, wherein said rods are joined together by a non-conductive metal-bonding agent at said abutting surfaces.

4. The member defined by claim 1, wherein the rods positively interlock with each other at said abutting surfaces.

5. The member defined by claim 1, wherein the rods bound a central axially-extending passage through which coolants may be conducted.

6. The member defined by claim 1, wherein each of the rods is so shaped that the exterior of the member has recesses in which supply lines for coils mounted upon the exterior can be accommodated.

7. The member defined by claim 1, further including at least one coil body mounted thereon, the member having an exterior surface and said at least one coil body having an interior surface mating with the exterior surface to permit said at least one coil body to be slipped onto the member.

8. The member defined by claim 1, wherein the member is constructed of a heat-treated material.

9. A polyphase linear motor, comprising an external flux-conducting member including at least two like curved frame elements which are made of ferromagnetic material and which are secured together so as to form a hollow, open-ended generally cylindrical axially elongated frame, and at least two axially adjacenat annular magnet rings received with the frame elements and having radially extending directions of magnetization, said at least two annular magnet rings being so located that axially adjacent annular magnet rings have mutually opposed directions of magnetization; and an internal flux-conducting member positioned in said frame and formed as an elongated electrically conductive element with an axis and assembled of a plurality of separate elongated rods having abutting surfaces, said abutting surfaces extending essentially radially outwardly from an interior of the member to an exterior thereof and forming at least one axially elongated and radially extending electrical discontinuity which is so situated that circumferential eddy currents within the element are prevented from flowing in paths which are circular as viewed along the axis.

10. The motor defined by claim 9, wherein each magnet ring includes at least two like arcuate half-shells having like radially extending directions of magnetization.

11. The motor defined by claim 10, wherein each arcuate half-shell is bonded to a corresponding one of the frame elements.

12. The motor defined by claim 1, wherein said rods have a shaped identical configuration.

* * * * *